(12) United States Patent
Mitchell

(10) Patent No.: US 11,121,352 B2
(45) Date of Patent: Sep. 14, 2021

(54) METHODS AND APPARATUSES FOR ENERGY STORAGE DEVICE ELECTRODE FABRICATION

(71) Applicant: Maxwell Technologies, Inc., San Diego, CA (US)

(72) Inventor: Porter Mitchell, Chandler, AZ (US)

(73) Assignee: Maxwell Technologies, Inc., San Diego, CA (US)

(*) Notice: Subject to any disclaimer, the term of this patent is extended or adjusted under 35 U.S.C. 154(b) by 32 days.

(21) Appl. No.: 16/175,344

(22) Filed: Oct. 30, 2018

(65) Prior Publication Data

US 2019/0131613 A1 May 2, 2019

Related U.S. Application Data

(60) Provisional application No. 62/580,920, filed on Nov. 2, 2017.

(51) Int. Cl.

| | |
|---|---|
| *H01M 4/04* | (2006.01) |
| *H01M 4/62* | (2006.01) |
| *H01M 4/587* | (2010.01) |
| *H01M 4/38* | (2006.01) |
| *H01G 11/46* | (2013.01) |

(Continued)

(52) U.S. Cl.
CPC .......... *H01M 4/0402* (2013.01); *H01G 11/36* (2013.01); *H01G 11/44* (2013.01); *H01G 11/46* (2013.01); *H01G 11/50* (2013.01); *H01G 11/86* (2013.01); *H01M 4/0404* (2013.01); *H01M 4/139* (2013.01); *H01M 4/1391* (2013.01); *H01M 4/1393* (2013.01); *H01M 4/1395* (2013.01); *H01M 4/38* (2013.01);

(Continued)

(58) Field of Classification Search
CPC .. H10M 4/0457; H10M 4/8875; H10M 4/622; H10M 4/602
See application file for complete search history.

(56) References Cited

U.S. PATENT DOCUMENTS

| 6,217,623 | B1 * | 4/2001 | Reichert | ................. H01M 4/04 29/623.1 |
|---|---|---|---|---|
| 2004/0018430 | A1 * | 1/2004 | Holman | .................. H01M 4/62 429/233 |

(Continued)

OTHER PUBLICATIONS

Büchi Labortechnik, A. G. "Training papers spray drying." Order Code 97758 (2002).

(Continued)

*Primary Examiner* — Matthew J Merkling
(74) *Attorney, Agent, or Firm* — Knobbe Martens Olsn & Bear LLP

(57) ABSTRACT

Apparatuses and methods for forming an electrode film mixture are described. An apparatus for forming an electrode film mixture can have a first source including a solution comprising a polymer, for example, polytetrafluoroethylene and a critical or supercritical fluid, for example, supercritical carbon dioxide, a second source including a second component of the electrode film mixture, a mixer configured to receive the solution and the second component and to form a slurry comprising the solution and the second component. The apparatus can include a decompressor configured to receive the slurry and decompress the slurry to vaporize the critical or supercritical fluid and precipitate dry polymer.

29 Claims, 3 Drawing Sheets

(51) Int. Cl.
*H01G 11/86* (2013.01)
*H01G 11/36* (2013.01)
*H01G 11/50* (2013.01)
*H01G 11/44* (2013.01)
*H01M 4/485* (2010.01)
*H01M 4/139* (2010.01)
*H01M 4/583* (2010.01)
*H01M 4/1393* (2010.01)
*H01M 4/1395* (2010.01)
*H01M 4/1391* (2010.01)

(52) U.S. Cl.
CPC ........... *H01M 4/485* (2013.01); *H01M 4/583* (2013.01); *H01M 4/587* (2013.01); *H01M 4/623* (2013.01)

(56) References Cited

U.S. PATENT DOCUMENTS

| | | | |
|---|---|---|---|
| 2009/0155678 A1 | 6/2009 | Less et al. | |
| 2009/0194747 A1 | 8/2009 | Zou et al. | |
| 2009/0224198 A1* | 9/2009 | Mori | H01G 11/24 252/62.3 Q |
| 2013/0208429 A1* | 8/2013 | Liu | H01M 4/1397 361/729 |
| 2014/0329126 A1* | 11/2014 | Ho | H01M 4/13 429/128 |
| 2015/0352568 A1* | 12/2015 | Maher | B05B 7/02 427/2.14 |
| 2017/0062798 A1* | 3/2017 | Wang | B05B 5/1683 |
| 2017/0098826 A1 | 4/2017 | Mitchell et al. | |
| 2017/0327727 A1* | 11/2017 | Dreyer | C09K 8/528 |
| 2018/0062155 A1 | 3/2018 | Mitchell et al. | |
| 2019/0252668 A1* | 8/2019 | Phares | H01M 4/623 |

OTHER PUBLICATIONS

Khapli, et al. "Supercritical CO2 based processing of amorphous fluoropolymer Teflon-AF: Surfactant-free dispersions and superhydrophobic films." The Journal of Supercritical Fluids 85 (2014): 49-56.

Glebov, et al. (2001) Coating of metal powders with polymers in supercritical carbon dioxide. Ind. Eng. Chern. Res. 40(19):4058-4068.

Wang, et al. (2006) Coating carbon nanotubes with polymer in supercritical carbon dioxide. ChemComm 1670-1672.

* cited by examiner

METHODS AND APPARATUSES FOR ENERGY STORAGE DEVICE ELECTRODE FABRICATION

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entirety under 37 CFR 1.57. This application claims the benefit of U.S. Provisional Patent Application No. 62/580,920, filed Nov. 2, 2017, entitled "METHODS AND APPARATUSES FOR ENERGY STORAGE DEVICE ELECTRODE FABRICATION."

BACKGROUND

Field

The present invention relates to energy storage devices, particularly to apparatuses and methods for fabricating energy storage device electrodes.

Description of the Related Art

Various types of energy storage devices can be used to power electronic devices, including for example, capacitors, batteries, capacitor-battery hybrids and fuel cells. Such energy storage devices can have an anode and a cathode comprising one or more electrode films. The electrode films may comprise a polymer binder and one or more active electrode components. An electrical performance of the energy storage device can depend on one or more properties of the binder and active electrode components. Desired electrical performance of the energy storage device may be achieved by selecting the type of binder, active electrode components, and/or processes used for fabricating the electrode film.

However, energy storage device fabrication can invoke considerable costs. In particular, fabrication of electrodes to specification can require substantial resources. One difficulty is removing solvents and other processing additives from electrode films following fabrication. In wet electrode fabrication, solvent removal may require large amounts of power and time during which valuable manufacturing resources will be occupied. Improved fabrication techniques may also afford better performing electrodes due to, for example, providing a more homogeneous distribution of active and binder materials. Conventional dry electrode fabrication techniques avoid some of these problems, but at the cost of introducing other problems discussed further herein. Thus, there is a need for improved electrode fabrication techniques.

SUMMARY

Some embodiments provide an apparatus for forming an energy storage device electrode film mixture. The apparatus may comprise a first source comprising a polymer dispersion comprising a polymer binder and a critical or supercritical fluid, wherein the polymer binder is a first component of an energy storage device electrode film mixture, a second source comprising a second component of the energy storage device electrode film mixture, a mixer configured to receive the polymer dispersion and the second component, to form a slurry comprising the polymer dispersion and the second component, and a decompressor configured to receive and decompress the slurry and to vaporize the critical or supercritical fluid and deposit dry polymer binder onto the second component.

Further embodiments provide a method for forming an energy storage device electrode film mixture, comprising providing a polymer dispersion comprising a polymer binder dispersed in a critical or supercritical fluid, wherein the polymer binder is a first component of an energy storage device electrode film mixture, providing a second component of the energy storage device electrode film mixture, forming a slurry comprising the polymer dispersion and the second component, and decompressing the slurry to vaporize the critical or supercritical fluid and deposit dried polymer binder onto the second component.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

These and other features, aspects, and advantages of the present disclosure are described with reference to the drawings of certain embodiments, which are intended to illustrate certain embodiments and not to limit the invention.

DETAILED DESCRIPTION

Definitions

Figure 1:
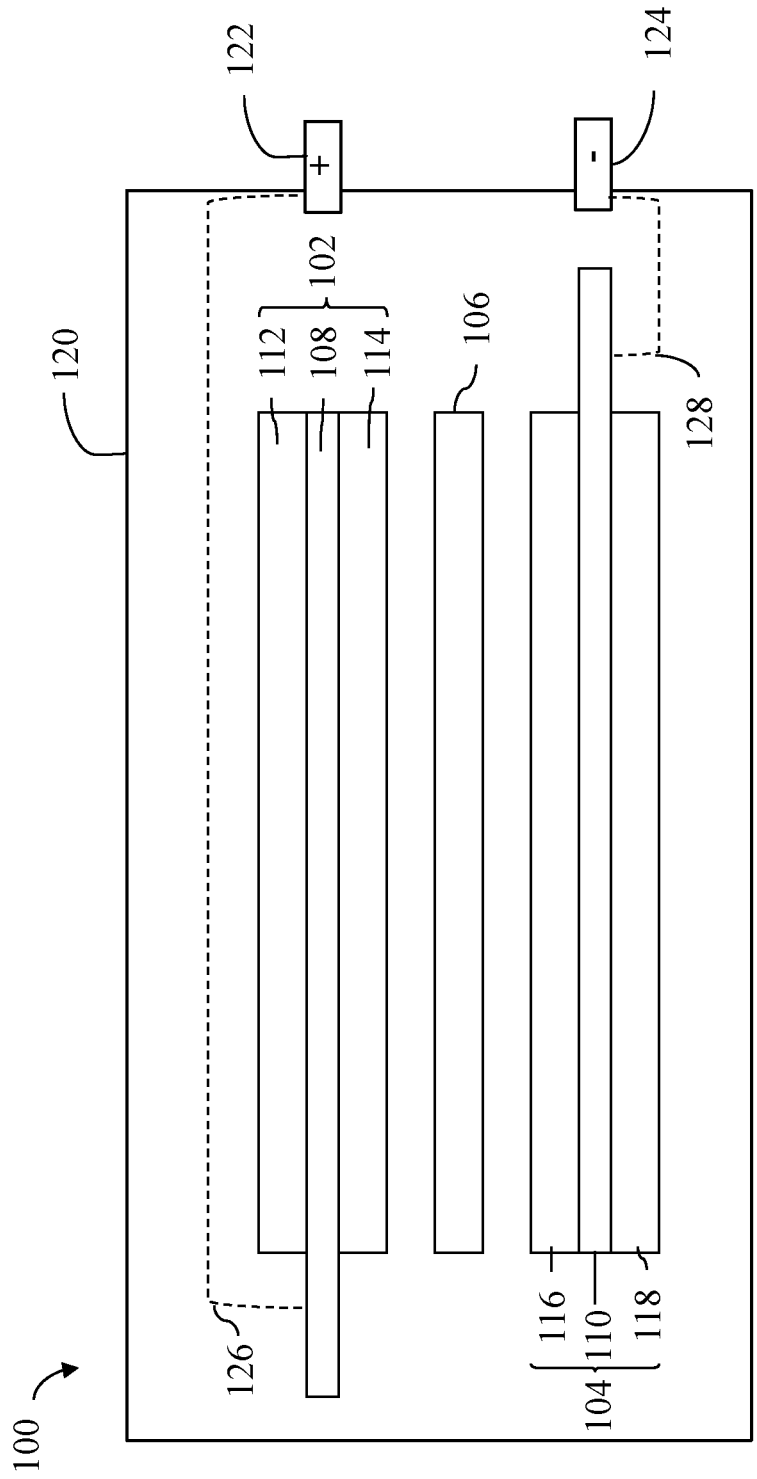
FIG. 1 is a schematic diagram of an energy storage device comprising one or more electrode films.

As used herein, the terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone, or operated as a component of a multi-cell system.

As used herein, the voltage of an energy storage device is the operating voltage for a single battery or capacitor cell. Voltage may exceed the rated voltage or be below the rated voltage under load, or according to manufacturing tolerances.

As provided herein, a "self-supporting" electrode film is an electrode film that incorporates binder matrix structures sufficient to support the film or layer and maintain its shape such that the electrode film or layer can be free-standing. When incorporated in an energy storage device, a self-supporting electrode film or active layer is one that incorporates such binder matrix structures. Generally, and depending on the methods employed, such electrode films or active layers are strong enough to be employed in energy storage device fabrication processes without any outside supporting elements, such as a current collector, support webs or other structures, although supporting elements may be employed to facilitate the energy storage device fabrication processes. For example, a "self-supporting" electrode film can have sufficient strength to be rolled, handled, and unrolled within an electrode fabrication process without other supporting elements. A dry electrode film, such as a cathode electrode film or an anode electrode film, may be self-supporting.

As provided herein, a "solvent-free" electrode film is an electrode film that contains no detectable processing solvents, processing solvent residues, or processing solvent impurities. Processing solvents or traditional solvents include organic solvents. A dry electrode film, such as a cathode electrode film or an anode electrode film, may be solvent-free.

A "wet" electrode or "wet process" electrode is an electrode prepared by at least one step involving a slurry of active material(s), binder(s), and processing solvents, processing solvent residues, and/or processing solvent impurities. A wet electrode may optionally include additive(s).

Description

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

Provided herein are apparatuses and processes for forming an energy storage device electrode film mixture. The apparatus or process may provide a first component of an electrode film mixture, which may comprise a polymer dispersion, the polymer dispersion comprising a critical or supercritical fluid and a polymer. The polymer may be suitable for use in binding an active material in an electrode film. The apparatus or process may further provide a second component of the electrode film mixture, which may comprise an electrode active material. The apparatus or process may further provide a mixer in fluid communication with a first inlet configured to receive the polymer dispersion, and a second inlet configured to receive the second component of the electrode film mixture.

Apparatuses or processes described herein may provide one or more advantages compared to conventional apparatuses or processes for forming wet or dry electrode films, or the raw materials used to form such films. For example, one or more apparatuses or processes described herein may facilitate formation of thicker electrode films to provide increased device energy density performance, compared to electrode films fabricated using wet coating processes. For further example, one or more apparatuses or processes described herein may reduce manufacturing costs compared to other electrode manufacturing apparatuses or processes.

Some conventional electrode film processes use raw materials slurried in a processing solvent, such as an organic solvent, which is subsequently applied to a current collector, and dried to form an electrode film. The rate at which such wet electrode films are dried may be affected by the drying kinetics of one or more organic solvents of the slurry used in the wet coating processes. The rate at which the electrode films can be dried may also be affected by the thickness of the electrode films. For example, the rate at which thicker electrode films are dried is often decreased to reduce or avoid drying defects. The vaporization kinetics of the one or more organic solvents may thereby affect the duration of a drying step used to achieve desired drying of the electrode film, and/or the physical length of the dryer used to dry such electrode films. The duration of drying and the length of the dryer may contribute to the cost of fabricating such electrodes. While thicker electrodes may be desired to provide higher device energy density, the cost for manufacturing electrode films beyond a certain thickness may be prohibitive. For example, the cost of equipment used to dry the wet-coated electrode films may rise more than proportionally, for example approximately exponentially, as the length of the dryer ovens increases. Provided herein are apparatuses and methods for fabrication of electrode films for energy storage devices without the use of drying equipment or a discrete drying step, and/or without a step of drying of an electrode film. In some implementations, no traditional or processing solvents, such as organic solvents, are used at any stage of the electrode film fabrication process.

Conventional dry electrode film processes use dry raw materials, which reduce or eliminate the need for the dryers required in wet-electrode film processes such as those described above. Such dry electrode film fabrication processes use high-shear equipment and processes, such as jet-milling, to provide sufficient shear for reducing in size and/or fibrillizing a binder material. Such processes may be limited to using only a fibrillizable binder, or even more limited to only using a specific binder, such as polytetrafluoroethylene (PTFE). For example, a mixture comprising a binder material, such as PTFE, and other electrode film components, may be jet-milled such that high shear forces can be provided to separate the binder material agglomerates into finely divided particles and/or fibrillize the binder material, such that the binder material can coat the other electrode film components. The resulting dry processed powder may be compressed with heat and pressure using a roll mill to form a film. The film forming process may be selected to provide structure to the electrode film, such as by a polymer binder cohering and adhering to other components of the film. The result may be, for example, a fibrillized matrix through the film. The thickness of the film may depend on the roll gap of the roll mill, pressure applied during the compression process, and/or number of times the film is compressed. The dry fabrication process may result in a fibrillized matrix such that the electrode film is a self-supporting electrode film.

However, such high-shear processes as used in typical dry electrode fabrication may damage one or more other components of the electrode film mixture. This damage may reduce performance of an electrode that is formed from these components. For example, use of a jet-milling process to exert high shear forces to separate the binder material agglomerates and/or fibrillize the binder material may undesirably degrade surface properties of one or more other components of the electrode film mixture. Without wishing to be limited by theory, it is thought that the forces applied in high shear processing may alter the form of the active material or materials, and/or may damage the surface of the active material. For example, the particles of active material may break, fuse, strip, or be chemically altered during such processing.

Active materials as incorporated in energy storage device electrodes may have coated and/or treated surfaces. For example, carbon materials, and in particular graphitic materials, may be coated with amorphous carbon. Alternatively or in addition, graphitic materials may be surface treated to reduce the first cycle inefficiencies during formation of solid electrolyte interphase, or improve cell cycle life. For example, one or more surface properties of carbon in the electrode film mixture may be degraded. Such degradation in surface properties may negatively affect one or more electrical properties of the energy storage device.

Without wishing to be limited by theory, it is thought that the composition of the active material surface affects degradation processes within the energy storage device, e.g., of the electrolyte and impurities therein, and also affects formation of a solid-electrolyte interphase (SEI) layer. Surface-treated active materials may exhibit better performance in an energy storage device electrode compared to active material(s) having untreated surfaces. Better performance may be due to, for example, reduced fissure formation and/or cracking, reduced separation of active material(s) from a current collector, reduced decomposition of the electrolyte, and/or reduced gassing. Thus, a dry electrode film fabricated using dry electrode film material made from one or more processes described herein may demonstrate improved electrical properties, for example, due to improved integrity of one or more components of the electrode film.

Disclosed herein are materials and methods providing active material(s) incurring reduced surface damage during fabrication. Certain embodiments of energy storage devices provided herein may provide reduced surface damage graphitic materials following processing. In particular, self-supporting electrode films including such active material(s) are provided. One or more processes described herein may avoid exposing electrode film components to high shear forces, facilitating preservation of the integrity of the components. In some embodiments, manufacturing costs may be reduced when reducing or eliminating the use of jet-mills, or other high-shear apparatus, and associated equipment, such as air compressors and/or associated mixers.

Additionally, electrode films fabricated using typical dry electrode fabrication processes, including high shear processes, may be limited to those binder materials which are fibrillizable using high shear forces, such as, for example, PTFE. Thus, typical dry electrode fabrication processes may limit the choice of binder, which may in turn limit the materials used in the energy storage device. As an example, use of PTFE binder may lead to reduced performance, reduced cell life, or even be incompatible with the materials used in certain types of energy storage devices, and may be, for example, incompatible with one or more other components of certain electrode films. For example, PTFE may be an unsuitable binder for certain electrode film applications due to its potential reactivity in low voltage environments. One or more processes described herein can be compatible with binder materials other than PTFE, thereby facilitating use of binder materials which are more compatible with lithium to fabricate electrodes for use in lithium ion based energy storage devices. Thus, provided herein are dry electrode processes that are compatible with binders used as an alternative to or in combination with PTFE.

In some embodiments, energy storage device electrode film mixtures, and processes and apparatuses for preparing such electrode film mixtures, are provided. The electrode film mixture may include a first component, which may comprise a polymer dispersion, and a second component, which may comprise an electrode active material. In some embodiments, an electrode film mixture comprises particles of an electrode film component coated by a polymer binder, the electrode film component being a different material from the polymer. For example, the polymer may be a polymer binder, which may be a fluoropolymer. In some embodiments, the fluoropolymer comprises, consists essentially, or consists of PTFE. In some embodiments, the electrode film component can comprise a particulate material. In some embodiments, the second electrode film component can comprise a carbon, such as graphite, activated carbon, conductive carbon, soft carbon, and/or hard carbon. The second electrode film component can be an electrochemically active material suitable for use as a battery cathode active material. The second electrode film component can comprise a carbon composite with a metal oxide. In some embodiments, the second electrode film component can comprise an intercalatable metal oxide, such as a lithium metal oxide. The second electrode film component can comprise amorphous carbon. The second electrode film component can comprise a composite of two or more carbons, such as graphitic and amorphous carbons. The electrode film mixture may comprise a plurality of graphite particles coated with PTFE. The term "coated" can include a substantially continuous film of the polymer binder surrounding and covering each of the electrode film component (e.g., an active material such as graphite) particles, for example, through induced dipole interactions and/or London dispersion forces which cause the polymer binder to coalesce and surround the second electrode film component.

In some embodiments, an apparatus for forming one or more electrode film mixtures described herein comprises a decompressor. In some embodiments, the apparatus comprises a first source which houses a polymer dispersion comprising a critical or supercritical fluid and a polymer binder, a second source housing a second electrode film mixture component, and a mixer configured to receive from the first source the dispersion and from the second source the second electrode film mixture component. The mixer may be configured to combine the dispersion and the second electrode film mixture components to provide a slurry. In some embodiments, the apparatus comprises a decompressor configured to receive the slurry, and a collector container configured to receive an output of the decompressor. In some embodiments, the decompressor and the collector container may be coextensive, for example the collector container and the decompressor may share a component.

In some embodiments, a process for preparing one or more electrode film mixtures described herein comprises providing into the mixer the polymer dispersion comprising a polymer binder and a critical or supercritical fluid from the first source, and the second electrode film mixture component from the second source. A slurry comprising the polymer dispersion and the second electrode film mixture component can be formed in the mixer. The slurry may be provided to the decompressor, where the slurry may be decompressed to vaporize the critical or supercritical fluid portion of the slurry, such as the supercritical carbon dioxide. The process may deposit a dry polymer binder and second electrode film mixture component. In some embodiments, the dry polymer binder can coat the second electrode film mixture component. In some embodiments, the coated second electrode film mixture component can be received in the collector container.

As provided herein, a "dispersion," and including a "polymer dispersion" is a composition including a solid or semi-solid material dispersed in a fluid phase. The material may be a polymer, for example a polymer binder as provided herein, to form a "polymer dispersion." A dispersion as provided herein may be a solution of the material dissolved in the fluid.

In some embodiments, the binder is not PTFE. In further embodiments, the polymer dispersion does not comprise PTFE.

In some embodiments, one or more electrode film mixtures described herein may be combined with one or more other components of the electrode film mixture and subsequently calendered to form an electrode film. The other components may be, for example, a third electrode film mixture component. The third electrode film mixture component can be combined with the electrode film mixture following a coating process as described herein. For example, the third electrode film mixture component can be added to the electrode film mixture comprising the first component and the second component thereof. Alternatively or in addition, the third electrode film mixture component can be combined with the first component and/or the second component prior to mixing. As a nonlimiting example, the third electrode film mixture component can be dispersed in the critical or supercritical fluid of the polymer dispersion.

The third electrode film mixture component may comprise additional binder materials, which may be the same or different as those included in the polymer dispersion. The additional binder material may be any binder provided herein. The additional binder may be, or may comprise, for example, PVDF or CMC. Alternatively or in addition, the third electrode film mixture component may comprise, for example, conductive materials or additional active materials. The active materials can be any described herein, and may be, for example, a carbon material or an electrochemically active material. Alternatively or in addition, the third electrode film mixture component may comprise a conductive electrode film material.

The electrode film formed from an electrode film mixture provided herein may be suitable for use in an anode or cathode of an energy storage device. For example, the electrode film may be coupled to a current collector of an anode or cathode, such as by using a lamination process. The electrode films described herein can be used to form anodes and/or cathodes of an energy storage device, for example, batteries, capacitors, capacitor-battery hybrids, fuel cells, combinations thereof, and the like. The energy storage device may operate with or without lithium. In some embodiments, the electrode films can be used to fabricate batteries, such as lithium ion batteries, or other metal ion batteries. In some embodiments, the electrode films can be used to fabricate ultracapacitors, such as electric double layer capacitors (EDLC). In some embodiments, the electrode films can be used to fabricate lithium ion capacitors. The electrode film may be a self-supporting electrode film as provided herein.

FIG. 1 shows a side cross-sectional schematic view of an example of an energy storage device 100. The energy storage device 100 may be any number of energy storage devices, such as a lithium ion capacitor, lithium ion battery, or an electric double layer capacitor. Of course, other energy storage devices are within the scope of the invention, and device 100 can be other types of capacitors, batteries, capacitor-battery hybrids, or fuel cells. The energy storage device 100 can have a first electrode 102, a second electrode 104, and a separator 106 positioned between the first electrode 102 and second electrode 104. For example, the first electrode 102 and the second electrode 104 may be placed adjacent to respective opposing surfaces of the separator 106. The first electrode 102 may comprise a cathode and the second electrode 104 may comprise an anode, or vice versa. The energy storage device 100 may include an electrolyte to facilitate ionic communication between the electrodes 102, 104 of the energy storage device 100. For example, the electrolyte may be in contact with the first electrode 102, the second electrode 104 and the separator 106. The electrolyte, the first electrode 102, the second electrode 104, and the separator 106 may be received within an energy storage device housing 120. For example, the energy storage device housing 120 may be sealed subsequent to insertion of the first electrode 102, the second electrode 104 and the separator 106, and impregnation of the energy storage device 100 with the electrolyte, such that the first electrode 102, the second electrode 104, the separator 106, and the electrolyte may be physically sealed from an environment external to the housing.

The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a variety of porous or nonwoven electrically insulating materials. In some embodiments, the separator 106 can comprise a polymeric material. The separator 106 can comprise a composite of polymeric materials. The separator 106 can comprise a composite of one or more polymeric materials with a ceramic, and/or metal oxide. The ceramic or metal oxide can be a powder. For example, the separator 106 can comprise a cellulosic material, such as paper. The separator 106 can comprise a porous or nonwoven polyethylene (PE) material. The separator 106 can comprise polytetrafluoroethylene material, such as a porous polytetrafluoroethylene material. The separator 106 can comprise a polypropylene (PP) material, such as a porous or nonwoven polypropylene (PP) material. The separator 106 can comprise a polyethylene coating, for example, on a porous or nonwoven polypropylene material or a composite of polymeric materials.

As shown in FIG. 1, the first electrode 102 and the second electrode 104 can include a first current collector 108, and a second current collector 110, respectively. The first current collector 108 and the second current collector 110 may facilitate electrical coupling between the corresponding electrode and an external circuit (not shown). The first current collector 108 and the second current collector 110 can comprise one or more electrically conductive materials. The first current collector 108 and the second current collector 110 can have various shapes and/or sizes. The first current collector 108 and the second current collector 110 can be configured to facilitate transfer of electrical charges between the corresponding electrode and an external circuit. For example, the first current collector 108 can be electrically coupled to a first energy storage device terminal 122, such as an electrically positive terminal, via a first connection 126. The second current collector 110 may be electrically coupled to a second energy storage device terminal 124, such as an electrically negative terminal, via a second connection 128. The first and second energy storage device terminals, 122, 124, may be electrically coupled to respective terminals of an external circuit to couple the energy storage device 100 to the external circuit.

A current collector can include a metallic material, such as a material comprising aluminum, nickel, copper, silver, alloys thereof, and/or other metallic materials, or nonmetallic materials such as graphite which remain inert at the electrode potentials of the device. The first current collector 108 and/or the second current collector 110 can comprise a foil. The first current collector 108 and the second current collector 110 can have a rectangular or substantially rectangular shape and can be dimensioned to provide desired transfer of electrical charges between the corresponding electrode and an external electrical circuit. The energy storage device 100 can comprise any of a number of different configurations to provide said electrical communication between the electrodes 102, 104 and the external electrical circuit through the current collectors 108, 110, respectively. For example, said transfer can be provided via a current collector plate and/or another energy storage device component.

The first electrode 102 may have a first electrode film 112 (e.g., an upper electrode film) on a first surface of the first current collector 108 (e.g., on a top surface of the first current collector 108). The first electrode 102 may have a second electrode film 114 (e.g., a lower electrode film) on a second opposing surface of the first current collector 108 (e.g., on a bottom surface of the first current collector 108). Similarly, the second electrode 104 may have a first electrode film 116 (e.g., an upper electrode film) on a first surface of the second current collector 110 (e.g., on a top surface of the second current collector 110). The second electrode 104 may have a second electrode film 118 on a second opposing surface of the second current collector 110 (e.g., on a bottom surface of the second current collector 110). For example, the first surface of the second current collector 110 may face the second surface of the first current collector 108, such that the separator 106 is adjacent to the second electrode film 114 of the first electrode 102 and the first electrode film 116 of the second electrode 104.

The electrode films 112, 114, 116 and/or 118 can have a variety of suitable shapes, sizes, and/or thicknesses. For example, the electrode films can have a thickness of about 30 microns (μm) to about 2000 microns, including about 100 microns to about 250 microns, and further including about 30 microns to about 250 microns. The electrode films of 112, 114, 116 and/or 118 can have the same or different thicknesses, compositions, and densities with respect to each other. For example, the electrode films of 112 and 114 can have a different thickness, composition or density compared to the electrode films 116 and 118. One or more of the electrode films 112, 114, 116 and/or 118 can be fabricated using an apparatus or method as provided herein.

In some embodiments, an electrode film of an anode and/or a cathode of an energy storage device comprises an electrode film mixture comprising a polymer, such as a polymer binder material, and one or more other components. Polymer is a general term and can include homo-polymers, co-polymers, and admixtures of polymers as provided herein. In some embodiments, the electrode film of an anode and/or a cathode can include one or more active electrode components. In some embodiments, the active electrode components are carbon-based. In some embodiments, the one or more active electrode components comprise a porous carbon material, such as activated carbon. In some embodiments, the one or more active electrode components comprise carbon configured to reversibly intercalate lithium ions, such as graphite, soft carbon and/or hard carbon. In some embodiments, the active electrode component comprises a lithium metal oxide. In some embodiments, the electrode film of an anode and/or a cathode can include one or more additives, including electrical or ionic conductivity promoting additives. In some embodiments, the electrical conductivity promoting additive can be carbon black. In some embodiments, the electrode film mixture comprises the binder material, one or more active electrode components, and/or one or more electrical conductivity promoting additives. In some embodiments, a binder material can include one or more of a variety of suitable polymeric materials, such as polytetrafluoroethylene (PTFE), ultra-high molecular weight polyethylene (UHMWPE), a binder provided herein, and/or other suitable and optionally fibrillizable materials, used alone or in combination. In some embodiments the active electrode components incorporate a lithium ion rich source for the purpose of pre-lithiating the anode, advantageously reducing or eliminating first cycle inefficiency.

In some embodiments, a process for coating a polymer onto one or more other components of an electrode film mixture can comprise a depressurization process. For example, PTFE can be coated onto one or more other components of the electrode film mixture using a depressurization process.

Figure 2:
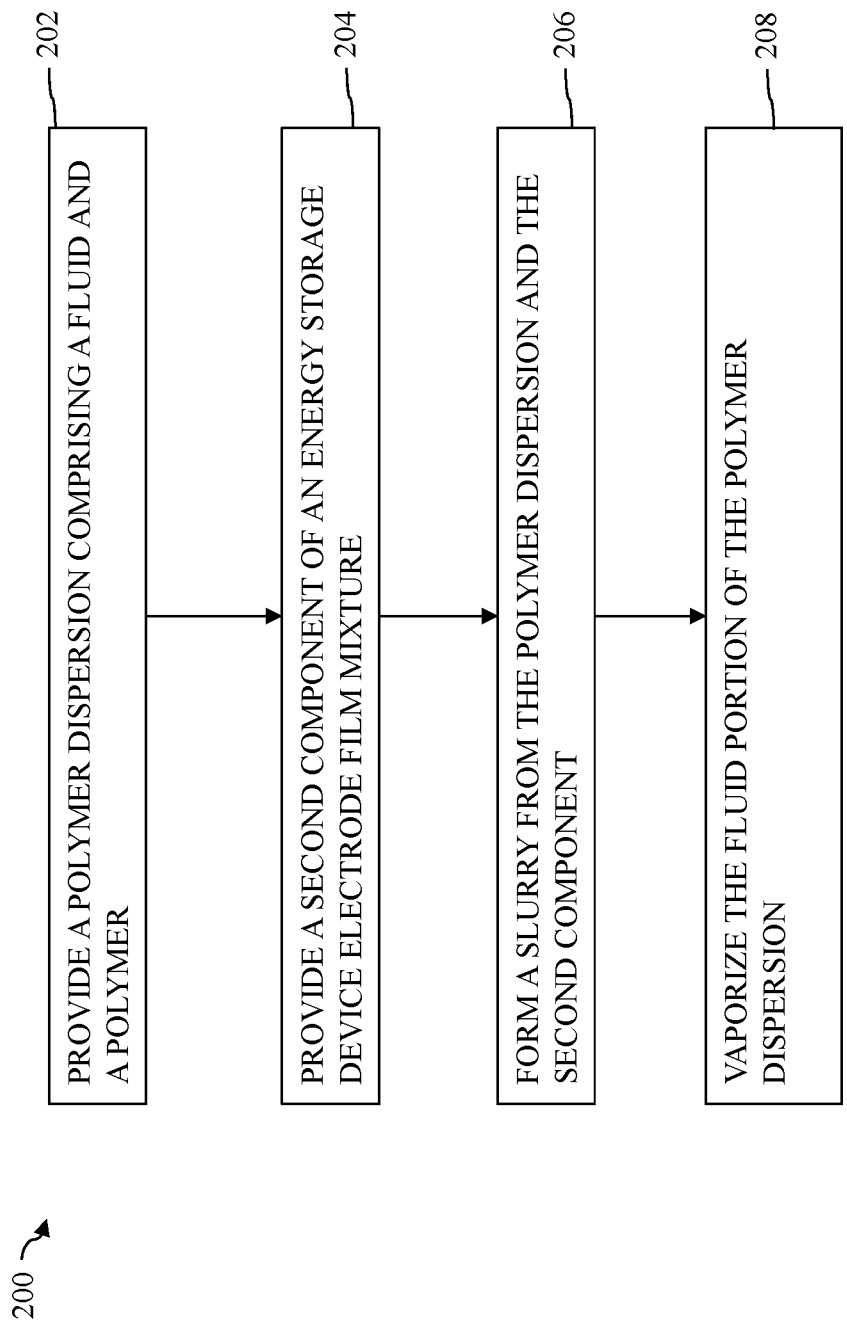
FIG. 2 is a process flow diagram of an embodiment of a process for forming an electrode film mixture.

FIG. 2 is a process flow diagram of an embodiment of a process 200 for forming an electrode film mixture. Process 200 provides a depressurization method for coating a polymer, such as a polymer binder, onto one or more other components of an electrode film mixture. In block 202, a polymer dispersion, is provided. The polymer dispersion comprises, consists essentially of, or consists of a fluid, and solid or semisolid polymer dispersed within the fluid. In some embodiments, the fluid can comprise, consist essentially of, or consist of a critical or supercritical fluid. In some embodiments, the fluid can comprise, consist essentially, or consist of supercritical carbon dioxide. In some embodiments, the fluid does not comprises a processing solvent, such as an organic solvent. In some embodiments, the polymer comprises, consists essentially of, or consists of a polymer binder suitable for use as an electrode film binder material. The polymer binder can comprise a material which remains electrochemically inert during operation of the energy storage device. The polymer binder can be either dispersed as a fine particulate within a carrier fluid, or can be dissolved in the fluid, or a combination of dispersed and dissolved. The polymer binder can mechanically form a film when mixed with energy storage active materials. Other types of polymers which can be used include but are not limited to thermoplastics, thermosets or elastomers. The polymer may be an admixture of two or more polymers, and/or a copolymer. The copolymer may be a graft, block, or random copolymer, or a combination thereof.

The polymer binder can include polytetrafluoroethylene (PTFE), a fluoropolymer, a polyolefin, polyalkylenes, polyethers, styrene-butadiene, co-polymers of polysiloxanes and polysiloxane, branched polyethers, polyvinylethers, co-polymers thereof, and/or admixtures thereof. The polymer binder can include a cellulose, for example, carboxymethylcellulose (CMC). In some embodiments, the polyolefin can include polyethylene (PE), polypropylene (PP), polyvinylidene fluoride (PVDF), co-polymers thereof, and/or mixtures thereof. For example, the polymer binder can include polyvinylene chloride, poly(phenylene oxide) (PPO), poly-ethylene-block-poly(ethylene glycol), poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In some embodiments, the polymer binder comprises a fibrillizable polymer.

In some embodiments, the polymer binder may comprise PTFE and optionally one or more additional polymeric components. In some embodiments, the polymer binder may comprise one or more polyolefins and/or co-polymers thereof, and PTFE. In some embodiments, the polymer binder may comprise a PTFE and one or more of a fluoropolymer, a cellulose, a polyolefin, a polyether, a precursor of polyether, a polysiloxane, co-polymers thereof, and/or admixtures thereof. An admixture of polymers may comprise interpenetrating networks of the aforementioned polymers or co-polymers. In some embodiments, the polymer comprises, consists essentially of, or consists of PTFE.

For example, the polymer dispersion can be a supercritical carbon dioxide based dispersion of a polymer binder comprising, consisting essentially of, or consisting of PTFE. In some embodiments, the polymer dispersion is a solution of PTFE in supercritical carbon dioxide. In some embodiments, the polymer dispersion may be a suspension. In further embodiments, the polymer dispersion may be a solution. In still further embodiments, the polymer may not be dissolved in the fluid.

In block 204, a second component of an electrode film mixture is provided. In block 204, a second electrode film mixture component of the electrode film mixture may be separately provided, relative to the first electrode film mixture component. Block 204 can comprise providing the second component to a second inlet of a mixer, and optionally through the second inlet to the mixer. Thus, the first and second electrode film mixture components can remain separate from each other until they are within the mixer. Generally, the first inlet and the second inlet are components downstream of the first source and the second source, respectively, and provide fluid connection with the mixer. Block 204 can include providing the second component at a different time (e.g., prior to), or concurrently with, the step of providing the polymer dispersion as in block 202. Generally, the temperature and pressure of the polymer dispersion should be controlled in order to maintain the fluid in a flowable state suitable for dispersing the polymer. For example, in some embodiments the fluid should be temperature and/or pressure controlled so as to prevent a phase change. In certain embodiments, the fluid should be temperature and pressure controlled so as to prevent the fluid from forming a gas or a solid. In some embodiments, providing the second component comprises supplying the second component through a screw feeder, pneumatically, manually, or through another apparatus configured to supply particulate material through the second inlet.

Generally, the second component is a material different from the polymer binder of block 202. In some embodiments, the second component comprises particles. In some embodiments, the particles may be dry particles free of solvents. The second component can comprise, consist essentially of, or consist of an active electrode material. For example, the second component may comprise, consist essentially of, or consist of dry particles of an active electrode material. In some embodiments, the second component comprises, consists essentially of, or consists of an active electrode material of a cathode or an anode of an electric double-layer capacitor. In some embodiments, the second component comprises, consists essentially of, or consists of an active electrode material of a cathode or an anode of a lithium ion capacitor.

In some embodiments, the second component comprises, consists essentially of, or consists of an active electrode material of a cathode or an anode of a battery, for example, a lithium ion battery. In some embodiments, the second component comprises, consists essentially of, or consists of a carbon. In some embodiments, the carbon can comprise, consist essentially of, or consist of graphite, soft carbon and/or a hard carbon. In some embodiments, the carbon comprises, consists essentially of, or consists of activated carbon. In some embodiments, the second component comprises, consists essentially of, or consists of a lithium metal oxide. For example, the second component may comprise an anode or cathode battery active material.

Anode active materials can comprise, for example, an insertion material (such as carbon, graphite, and/or graphene), an alloying/dealloying material (such as silicon, silicon oxide, tin, and/or tin oxide), a metal alloy or compound (such as Si—Al, and/or Si—Sn), and/or a conversion material (such as manganese oxide, molybdenum oxide, nickel oxide, and/or copper oxide). The anode active materials can be used alone or mixed together to form multi-phase materials (such as Si—C, Sn—C, SiOx-C, SnOx-C, Si—Sn, Si—SiOx, Sn—SnOx, Si—SiOx-C, Sn—SnOx-C, Si—Sn—C, SiOx-SnOx-C, Si—SiOx-Sn, or Sn—SiOx-SnOx.).

The cathode active material can comprise, for example, a metal oxide, metal sulfide, or a lithium metal oxide. The lithium metal oxide can be, for example, a lithium nickel manganese cobalt oxide (NMC), a lithium manganese oxide (LMO), a lithium iron phosphate (LFP), a lithium cobalt oxide (LCO), a lithium titanate, and/or a lithium nickel cobalt aluminum oxide (NCA). In some embodiments, cathode active materials can be comprised of, for example, a layered transition metal oxide (such as $LiCoO_2$ (LCO), $Li(NiMnCo)O_2$ (NMC) and/or $LiNi_{0.8}Co_{0.15}Al_{0.05}O_2$ (NCA)), a spinel manganese oxide (such as $LiMn_2O_4$ (LMO) and/or $LiMn_{1.5}Ni_{0.5}O_4$ (LMNO)) or an oilivine (such as $LiFePO_4$). The cathode active material can comprise sulfur or a material including sulfur, such as lithium sulfide ($Li_2S$), or other sulfur-based materials, or a mixture thereof. In some embodiments, the cathode film comprises a sulfur or a material including sulfur active material at a concentration of at least 50 wt %. In some embodiments, the cathode film comprising a sulfur or a material including sulfur active material has an areal capacity of at least 10 $mAh/cm^2$. In some embodiments, the cathode film comprising a sulfur or a material including sulfur active material has an electrode film density of 1 $g/cm^3$. In some embodiments, the cathode film comprising a sulfur or a material including sulfur active material further comprises a binder. In some embodiments, the binder of the cathode film comprising a sulfur or a material including sulfur active material is selected from polytetrafluoroethylene (PTFE), polyvinylidene fluoride (PVDF), poly(ethylene oxide) (PEO), polyethylene (PE), polyacrylic acid (PAA), gelatin, other thermoplastics, or any combination thereof.

In block 206, the polymer dispersion is combined with the second component to form a slurry. A slurry comprising the polymer dispersion and the second component of the electrode film mixture may be formed. The slurry may be formed using any method suitable for forming a composition in which the polymer and second electrode component are in intimate contact. The combining may be performed in a mixer. Generally, the combining should be sufficient to provide intimate contact between the second component and the polymer. In certain embodiments, the slurry may comprise particles of the second component dispersed in the fluid. For example, the slurry may comprise the second electrode component as a colloid carried by the critical or supercritical fluid, and the polymer as a solution within the critical or supercritical fluid. The polymer dispersion may be supplied to the mixer such that the polymer dispersion can be distributed within the mixer to achieve intimate contact. Generally, the critical or supercritical fluid retains its phase in the step of block 206. In some embodiments, the slurry does not comprises a processing solvent, such as an organic solvent.

In block 208, the fluid portion of the polymer dispersion can be vaporized. For example, the fluid portion of the polymer dispersion can be vaporized by increasing the volume and/or decreasing the pressure of the slurry sufficiently to provide said vaporization. The fluid portion of the polymer dispersion can be vaporized by processing the slurry in any way sufficient to provide such vaporization, for example, within a suitably configured decompressor. Thus, the slurry may be decompressed to vaporize the critical or supercritical fluid. For example, the fluid portion of the dispersion may be vaporized, resulting in a dry polymer. In some embodiments, slurry can be processed by one or more components configured to increase the surface area and/or volume of the slurry, and facilitate the vaporization of the fluid portion of the polymer dispersion. For example, the slurry can be flowed through an orifice or aperture for increasing the surface area and/or volume of, and distributing the polymer dispersion, to facilitate the vaporization of the fluid portion of the polymer dispersion. The orifice or aperture can be configured to flow the slurry into the decompressor. Thus, the orifice may be configured to increase the surface area and expand the fluid portion of the polymer dispersion into the inner volume of the decompressor. Decompression of the slurry can be performed such that the fluid of the slurry undergoes rapid decompression. In some embodiments, one or more components of the decompressor can be heated directly or indirectly with heated fluidizing air to control the temperature to which the droplets are exposed so as to achieve desired vaporization of the fluid portion of the polymer dispersion. The pressure of the decompressor may be lower than that of the mixer. The pressure and/or temperature(s) of one or more components of the decompressor may be controlled to control the expansion of the fluid in the decompressor. In some embodiments, one or more sidewalls of the decompressor may be heated. In some embodiments, the orifice may be heated. The polymer dispersion may be depressurized such that the fluid portion of the polymer dispersion is vaporized to provide a dry polymer. Thus, the vaporization step 208 can include heating the polymer dispersion before, during, and/or after the polymer dispersion is introduced (e.g., sprayed) into the coating chamber. Other ways of vaporizing the polymer dispersion include, for example, heating the walls of a decompressor, either directly or indirectly.

As a result of the vaporization step 208, the polymer may be deposited on the second electrode mixture component, and a dry electrode film mixture is formed. In some embodiments, the second electrode film mixture component is coated with the polymer. For example, vaporizing the fluid portion of the polymer dispersion and depositing the polymer on the second component can be performed coextensively within the decompressor, such that the second component can be coated by the dry polymer. In some embodiments, the dry second electrode film mixture component coated with the dry polymer may be collected in a collector container, such as a filtered containment vessel.

As described herein, in some embodiments, the polymer dispersion is a dispersion comprising a polymer binder provided herein. As described herein, in some embodiments, the second component comprises graphite. In some embodiments, a dry powder comprising dry particles of graphite may be supplied to a second inlet, and the graphite can be combined with the polymer dispersion.

In some embodiments, particles of the second component are larger than a minimum size. In some embodiments, the particles may have a dimension, such as a diameter, a length, or a longest dimension, greater than about 3 microns (μm). In some embodiments, the approximate particle size of the second component can be about 3 microns, about 4 microns, about 5 microns, about 6 microns, about 7 microns, about 8 microns, about 9 microns, about 10 microns, or any range of values therebetween. In some embodiments, the polymer can form particles upon vaporization of the fluid in the polymer dispersion. In further embodiments, the droplets can be no larger than a maximum size. In some embodiments, the polymer particles are atomized particles. In various embodiments, the polymer particle sizes can be, for example, 0.01 to 0.1 microns. In some embodiments, the approximate particle size of the polymer can be about 0.01 microns, about 0.03 microns, about 0.05 microns, about 0.1 microns, about 0.2 microns, about 0.3 microns, about 0.5 microns, about 0.7 microns, about 1 micron, or any range of values therebetween. When the polymer is PTFE, the particle sizes may typically be about 0.1 to 0.2-microns. The orifice may be configured to control the particle size in part. Other factors which may affect the polymer particle size include the concentration of the polymer in the solution or dispersion, and in the case of non-solution dispersions, by a polymer particle size therein.

FIG. 3 is a schematic diagram of another example of an apparatus 300 for fabricating an electrode film mixture in which a rapid decompression process is used. For example, the process 200 described with reference to FIG. 2 may be performed using the apparatus 300 of FIG. 3. The apparatus 300 can include a polymer dispersion source 302, comprising a polymer dispersed in a critical or supercritical fluid. The apparatus 300 can include a second electrode film mixture component source 304, a mixer 306, a decompressor 308 and a collector container 310. As shown in FIG. 3, the polymer dispersion source 302 and the second electrode film mixture component source 304 can be in fluid communication with the mixer 306. For example, a polymer dispersion from source 302 and a second electrode film mixture component from source 304 can be received by the mixer 306 such that a slurry is formed. The second electrode film mixture component may be batch loaded into the mixer 306, or fed substantially continuously through an opening, such as a second inlet from the second source 304, using a powder delivery method. The powder delivery method may be, for example, a screw feeder. The polymer dispersion 302 may optionally include an additional mixture component. The additional mixture component may be, for example, a third electrode film mixture component as provided herein.

The slurry can undergo volume expansion in decompressor 308. Vaporization of the critical or supercritical fluid portion of the slurry may occur as a result of the volume expansion. For example, critical or supercritical fluid can be vaporized by the decompressor 308 to provide dry polymer and dry second electrode film mixture component. In some embodiments, the slurry can be distributed as droplets within decompressor 308 such that the fluid portion of the polymer dispersion can be vaporized to provide a dry polymer, or particles thereof. Upon vaporization of the critical or supercritical fluid, the dry polymer can coat the dry second electrode film mixture component. In some embodiments, the second electrode film mixture component coated by the dry polymer can be collected in the collector container 310.

In some embodiments, the decompressor 308 and the collector container 310 may be coextensive. For example, the decompressor 308 and the collector container 310 may be a single component or volume. In some embodiments, the decompressor 308 and the mixer 306 can be coextensive. For example, the decompressor 308 and the mixer 306 may be a single component or volume, in which the polymer dispersion and the second electrode film mixture component are both mixed, and decompressed within a common volume.

In some embodiments, the slurry may be decompressed in decompressor 308 by passing the slurry from a first volume through an orifice into a second volume significantly larger than the first volume, such that the critical or supercritical fluid can expand. In some embodiments, the first volume may comprise a duct, for example, as a tube. In some embodiments, the second volume may comprise a collector container 310, which may be, for example, a filtered containment vessel. For example, the slurry may be passed through the duct from a first end of the duct to a second end of the duct, wherein the second end is coupled to an orifice. The dry polymer may coat the second component of the electrode film mixture within the filtered containment vessel.

In some embodiments, one or more electrode film mixtures described herein may be combined with one or more other electrode film components and subsequently calendared to form an electrode film. The electrode film may be one or more of the electrode films described with reference to FIG. 1. The electrode film may be incorporated in an energy storage device.

Figure 3:
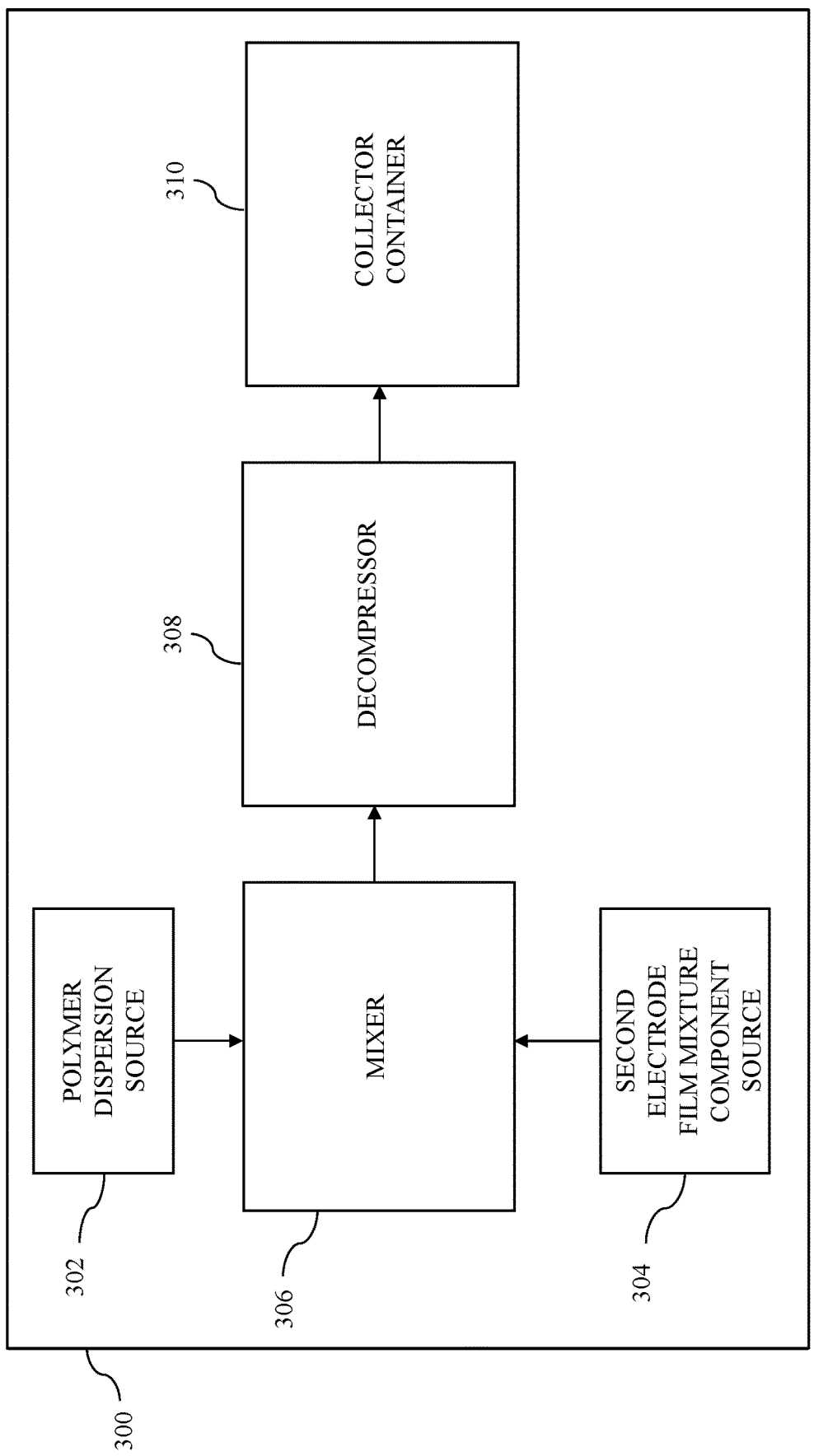
FIG. 3 is a schematic diagram of an embodiment of an apparatus for fabricating an electrode film mixture.

Additionally, alternative embodiments to the process in FIG. 2 and the apparatus in FIG. 3 are contemplated herein. For example, the second electrode film component and the polymer dispersion may be separately introduced (simultaneously, or sequentially) into a decompression chamber. Alternatively, a slurry of the second electrode film component and the polymer dispersion may be separately introduced into the decompression chamber with a third electrode film component, to coat each of the second and third components with the polymer.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above.

The headings provided herein, if any, are for convenience only and do not necessarily affect the scope or meaning of the devices and methods disclosed herein.

What is claimed is:

1. An apparatus for forming an energy storage device electrode film mixture, comprising:
a first source comprising a polymer dispersion, wherein the polymer dispersion comprises a polymer binder and a critical or supercritical fluid, and wherein the polymer binder is a first component of an energy storage device electrode film mixture;
a second source comprising a second component of the energy storage device electrode film mixture;
a mixer comprising a mixer volume, a first inlet and a second inlet, the mixer configured to receive the polymer dispersion from the first source through the first inlet into the mixer volume, and the second component from the second source through the second inlet into the mixer volume, and to form a slurry comprising the polymer dispersion and the second component within the mixer volume, wherein the first and second sources are different sources; and
a decompressor configured to receive and decompress the slurry within a decompressor volume, the decompressor further configured to vaporize the critical or supercritical fluid and deposit dry polymer binder onto the second component.

2. The apparatus of claim 1, wherein the second component comprises a particulate.

3. The apparatus of claim 1, wherein the second component comprises carbon.

4. The apparatus of claim 1, wherein the second component comprises an active electrode material.

5. The apparatus of claim 4, wherein the second component comprises graphite.

6. The apparatus of claim 4, wherein the second component comprises a battery cathode active material.

7. The apparatus of claim 6, wherein the second component comprises a lithium metal oxide.

8. The apparatus of claim 4, wherein the active electrode material comprises at least one of sulfur and a material including sulfur.

9. The apparatus of claim 1, wherein the supercritical fluid comprises supercritical carbon dioxide.

10. The apparatus of claim 1, wherein the polymer dispersion comprises a solution of the polymer binder in the critical or supercritical fluid.

11. The apparatus of claim 1, wherein the polymer binder comprises polytetrafluoroethylene (PTFE).

12. The apparatus of claim 1, further comprising a collector container configured to receive the dry polymer binder.

13. The apparatus of claim 12, wherein the collector container comprises a filtered containment vessel.

14. The apparatus of claim 1, wherein the decompressor comprises an orifice, and wherein the decompressor is configured to pass the slurry through the orifice to decompress the slurry and vaporize the fluid.

15. A method for forming an energy storage device electrode film mixture using the apparatus of claim 1, comprising:
providing the polymer dispersion to the mixer volume through the first inlet from the first source;
providing the second component of the energy storage device electrode film mixture to the mixer volume through the second inlet from the second source;
activating the mixer to form a slurry comprising the polymer dispersion and the second component within the mixer volume;
and
decompressing the slurry in the decompressor volume to vaporize the critical or supercritical fluid and deposit dry polymer binder onto the second component.

16. The method of claim 15, wherein the second component comprises a particulate.

17. The method of claim 15, further comprising coating the second component with the dry polymer binder.

18. The method of claim 15, wherein the second component comprises carbon.

19. The method of claim 15, wherein the second component comprises an electrode active material.

20. The method of claim 19, wherein the active material comprises graphite.

21. The method of claim 19, wherein the active material comprises a lithium metal oxide.

22. The method of claim 19, wherein the active material comprises at least one of sulfur and a material including sulfur.

23. The method of claim 15, wherein the polymer binder comprises polytetrafluoroethylene (PTFE).

24. The method of claim 15, wherein the fluid is supercritical carbon dioxide.

25. The method of claim 15, wherein decompressing the slurry comprises passing the slurry through an orifice.

26. The method of claim 15, wherein depositing the polymer binder comprises coating the second component with dry polymer binder.

27. The method of claim 26, further comprising receiving a coated second component in a collector container.

28. The method of claim 27, wherein the collector container comprises a filtered containment vessel.

29. The apparatus of claim 1, wherein the mixer volume and the decompressor volume comprise a common volume.

* * * * *